US011264639B2

(12) United States Patent
Rupert et al.

(10) Patent No.: US 11,264,639 B2
(45) Date of Patent: Mar. 1, 2022

(54) ADDITIVES FOR PARTICLE SIZE CONTROL

(71) Applicant: Blue Current, Inc., Berkeley, CA (US)

(72) Inventors: Benjamin Rupert, Berkeley, CA (US); Alexander Teran, Oakland, CA (US)

(73) Assignee: Blue Current, Inc., Hayward, CA (US)

( * ) Notice: Subject to any disclaimer, the term of this patent is extended or adjusted under 35 U.S.C. 154(b) by 248 days.

(21) Appl. No.: 16/212,573

(22) Filed: Dec. 6, 2018

(65) Prior Publication Data

US 2019/0173120 A1 Jun. 6, 2019

Related U.S. Application Data

(60) Provisional application No. 62/595,476, filed on Dec. 6, 2017.

(51) Int. Cl.
| | |
|---|---|
| *H01M 10/056* | (2010.01) |
| *C03C 3/32* | (2006.01) |
| *C03C 4/14* | (2006.01) |
| *C03C 12/00* | (2006.01) |
| *C03C 17/32* | (2006.01) |
| *C03C 14/00* | (2006.01) |
| *C03C 17/00* | (2006.01) |

(52) U.S. Cl.
CPC .......... *H01M 10/056* (2013.01); *C03C 3/321* (2013.01); *C03C 4/14* (2013.01); *C03C 12/00* (2013.01); *C03C 14/008* (2013.01); *C03C 17/009* (2013.01); *C03C 17/32* (2013.01); *C03C 2204/00* (2013.01); *H01M 2300/0068* (2013.01); *H01M 2300/0082* (2013.01); *H01M 2300/0091* (2013.01)

(58) Field of Classification Search
None
See application file for complete search history.

(56) References Cited

U.S. PATENT DOCUMENTS

| 9,595,735 B2 | 3/2017 | Sugiura et al. |
| 2014/0093785 A1 | 4/2014 | Sugiura et al. |

FOREIGN PATENT DOCUMENTS

| CN | 106145065 | * 11/2016 |

OTHER PUBLICATIONS

Machine translation of CN106145065. (Year: 2016).*
Tatsumisago, M. et al. "Recent development of sulfide solid electrolytes and interfacial modification for all-solid-state rechargeable lithium batteries," *Journal of Asian Ceramic Societies* 1 (2013) 17-25.
Hayashi, A., et al. "Development of sulfide glass electrolytes for all-solid-state lithium batteries," Abstract #1188, Honolulu PRiME 2012, Copyright 2012, *The Electrochemical Society*, 2 pages.

* cited by examiner

*Primary Examiner* — Wyatt P McConnell
(74) *Attorney, Agent, or Firm* — Weaver Austin Villeneuve & Sampson LLP

(57) ABSTRACT

Methods of synthesizing particles and the resulting particles are disclosed. The methods include synthesizing the particles in the presence of one or more additives. The resulting particles are smaller and easier to disperse in solution. Also described are methods of processing particles and the resulting particles. In particular embodiments, the particles are suited for incorporation into films.

21 Claims, 7 Drawing Sheets

Figure 1. Size distribution of standard sulfide glass electrolyte particles synthesized with no additives, and no additional grinding steps after initial sieving.

Figure 1. Size distribution of standard sulfide glass electrolyte particles synthesized with no additives, and no additional grinding steps after initial sieving.

Figure 2. Comparison of size distributions of standard glass synthesis, and glass synthesized with either PE-b-PEO or LDS additives.

Figure 3. Comparison of size distributions of standard glass synthesis, and glass synthesized with SEBS, PFPE or SEBS+LDS additives. Note that the SEBS+LDS combination gives a similar particle size distribution as the LDS-only synthesis in Figure 2, which is smaller than the SEBS-only distribution seen in this figure.

Figure 4. Comparison of size distributions of standard glass, and the same glass wet milled with SEBS or LDS.

Figure 5. Size distribution of standard glass measured right after sample preparation and again after 10 minutes. At 10 minutes the particles have completely aggregated.

Figure 6. Size distribution of glass synthesized with LDS, measured right after sample preparation and again after 5, 10, and 30 minutes. While the overall intensity of the signal drops slightly over 30 minutes and the average size increases, indicating some aggregation and precipitation, the change is minor compared to the standard glass shown in Figure 5.

ADDITIVES FOR PARTICLE SIZE CONTROL

CROSS-REFERENCE TO RELATE APPLICATION

This application claims priority to U.S. Provisional Patent Application No. 62/595,476, filed Dec. 6, 2017, which is incorporated by reference herein.

FIELD OF INVENTION

The invention relates generally to the field of particle synthesis. More particularly, it relates to methods of synthesizing and milling particles using additives and the resulting compositions.

BACKGROUND

To cast films containing particles, such as in a sulfide glass-containing film electrolyte, particles having a diameter less than the thickness of the film are needed to avoid rough and uneven films. Standard sulfide glass syntheses produce a particle distribution including particles having fairly large diameters (e.g., greater than 40 μm in diameter). These large particles are difficult to remove and are unacceptable for casting smooth and even films.

SUMMARY

One aspect of the disclosure relates to a method including providing a raw material composition including sulfur; adding an amphiphilic compound to the raw material composition to form a mixture to be milled; and synthesizing sulfide-containing particles by mechanically milling the mixture. In some embodiments, the amphiphilic compound is an ionic compound. In some embodiments, the amphiphilic compound is a non-ionic compound. In some embodiments, sulfide containing particles are coated with the amphiphilic compound. In some embodiments, raw material composition includes lithium sulfide ($Li_2S$). In some embodiments, the raw material composition includes lithium sulfide ($Li_2S$) and phosphorous pentasulfide ($P_2S_5$). In some embodiments, the amphiphilic compound is a block copolymer, for example polyethylene-b-poly(ethylene oxide). In some embodiments, the amphiphilic compound includes a non-polar hydrocarbon chain covalently bonded to a non-ionic group. In some embodiments, the amphiphilic compound comprises lithium, for example, lithium dodecyl sulfate. In some embodiments, the method further includes wet milling the synthesized particles. In some such embodiments, the synthesized particles are wet milled in the presence of an amphiphilic compound. In some embodiments, the average diameter of the synthesized particles is less than 20 microns. In some embodiments, the average diameter of the synthesized particles is less than 10 microns. In some embodiments, none of the synthesized particles have a diameter greater than 20 microns. In some embodiments, the synthesized particles do not agglomerate substantially in a non-polar solvent after 10 minutes. In some embodiments, the method further includes incorporating the synthesized particles into a slurry. In some embodiments, the method further includes forming an electrolyte film incorporating the synthesized particles. In some such embodiments, the synthesized particles are not subject to wet milling prior to incorporation into the slurry or electrolyte film.

Another aspect of the disclosure relates to a method including: providing particles having a first size distribution; adding an additive to the particles; and milling the particles in the presence of the additive to reduce the size of the particles, wherein the particles have a second size distribution after milling, wherein the additive is an amphiphilic compound selected from ionic compounds and non-ionic compounds having non-polar hydrocarbon chains of between 6 and 50 carbons. In some embodiments, the additive coats the particles after milling. In some embodiments, the method further involves incorporating the particles into a slurry. In some embodiments, the amphiphilic compound is a block copolymer, for example, polyethylene-b-poly(ethylene oxide). In some embodiments, the amphiphilic compound includes lithium. In some embodiments, the amphiphilic compound is lithium dodecyl sulfate. In some embodiments, the method includes incorporating the particles into a slurry. In some embodiments, the method includes forming an electrolyte film incorporating the particles. In some such embodiments, the particles are not subject to wet milling prior to incorporation into the slurry or electrolyte film.

Another aspect of the disclosure relates to a composition including: an electrolyte film comprising one or more organic polymer components; and sulfide containing particles embedded in the electrolyte film, wherein the sulfide containing particles are coated with an amphiphilic compound and wherein the largest dimension of any sulfide containing particles is less than the thickness of the electrolyte film. In some embodiments, the amphiphilic compound is a block copolymer. In some embodiments, the amphiphilic compound is a polyethylene-b-poly(ethylene oxide). In some embodiments, the amphiphilic compound comprises a non-polar hydrocarbon chain covalently bonded to a non-ionic group. In some embodiments, the amphiphilic compound includes lithium. In some embodiments, the amphiphilic compound is lithium dodecyl sulfate. In some embodiments, the sulfide containing particles are sulfide glass particles. In some embodiments, the sulfide containing particles are sulfide glass ceramic particles.

DETAILED DESCRIPTION

One aspect of the present invention relates to methods of synthesizing glass particles and the resulting glass particles. The methods include synthesizing the glass particles in the presence of one or more additives. The resulting particles are smaller and easier to disperse in solution. Another aspect of the invention relates to methods of processing glass particles and the resulting sulfide glass particles. In particular embodiments, the glass particles are suited for incorporation into films.

Although sulfide glass particles are chiefly described below, the methods may be applied to oxide glass particles. Further, the methods are also applicable to glass-ceramic and ceramic particles, for example $Li_7P_3S_{11}$ and $Li_{10}GeP_2S_{12}$. As such, in some embodiments, the resulting particles are glass-ceramic or ceramic particles including sulfides or oxides.

In particular, one class of particles the methods may be performed with are argryodites. Structural analogs to the mineral Argyrodite, $Ag_8GeS_6$, are referred to as argyrodites. In particular, materials that retain the overall cation and anion arrangement (possibly with some sites vacant) are referred to as argryodites. Sulfide-based lithium argyrodite materials exhibit high Li+ mobility and are of interest in lithium batteries. A typical material in this family is $Li_6PS_5Cl$, which is a ternary co-crystal of $Li_3PS_4$, $Li_2S$, and LiCl. Another class of argyrodites having the formula $Li_{(6-y)}PS_4O_{(1-y)}X_{(1+y)}$ (also expressed $Li_3PS_4*(1-y)Li_2O*(1+y)X$) where X is a halide and y is a number between 0 and 0.8, inclusive, is described in U.S. Provisional Patent Application No. 62/744,331 incorporated by reference herein.

Given the discussion of synthesizing sulfide glass particles described below, one having ordinary skill in the art will understand that the techniques described therein can be extended to other glass, glass-ceramic, and ceramic particles.

Figure 7:
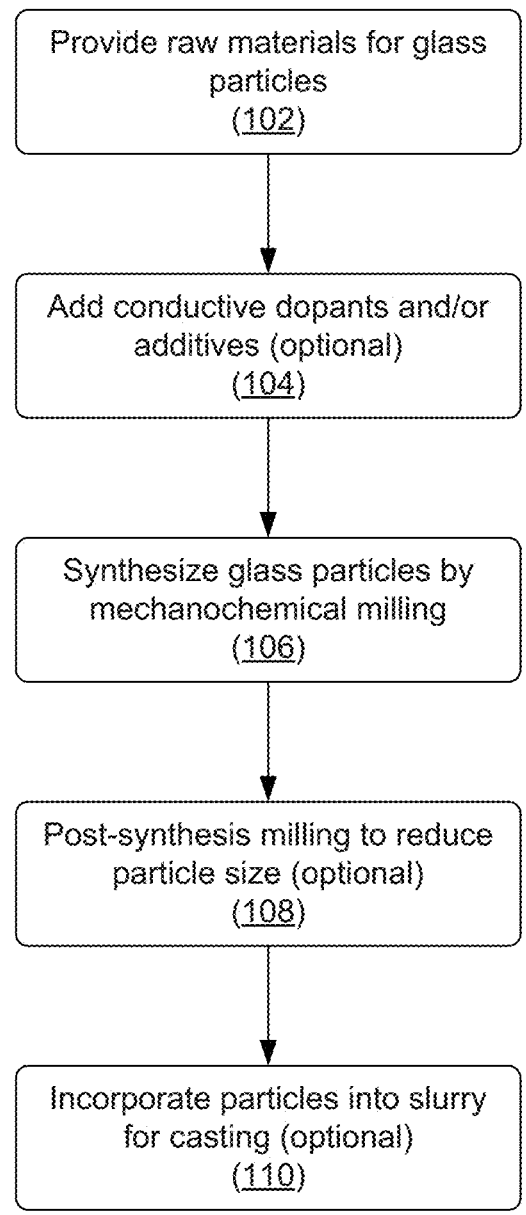
FIG. 7 is a process flow diagram that illustrates certain operations in methods of producing glass particles according to various aspects of the invention.

FIG. 7 is a process flow diagram that illustrates certain operations in methods of producing glass particles according to various aspects of the invention. FIG. 7 provides a context for discussing the operations in further detail. The process 100 begins with providing raw materials of the glass particles. (Block 102). These raw materials are the main components of the glass particle and include at least one sulfide containing material. For example, for lithium-ion conducting sulfide glass particles, lithium sulfide ($Li_2S$) is provided. Another component of the glass that is provided as a raw material may include at least one of phosphorous (P), germanium (Ge), aluminum (Al), silicon (Si) and boron (B). For example, phosphorus pentasulfide ($P_2S_5$) is provided at block 102, with $Li_2S$ to form $Li_2S$—$P_2S_5$-based glass particles. $Li_2S$—$P_2S_5$ systems, for example, are useful in many applications for their relatively high ionic conductivities. However, other components that may be provided at block 102, including phosphorous trisulfide ($P_2S_3$), boron sulfide ($B_2S_3$), and silicon disulfide ($SiS_2$). In some embodiments, the glasses are sodium-ion conducting sulfide glass particles, with example raw materials including sodium-containing compounds. The raw materials may be provided as powders.

One or more conductive dopants and additives may be provided at block 104. Dopants that enhance ionic conductivity include lithium halides such as lithium iodide (LiI), lithium borohydride ($LiBH_4$), and lithium ortho-oxosalts ($Li_3PO_4$). As discussed further below, in some embodiments, one or more additives that do one or more of reducing particle size, reducing particle size distribution, and facilitating dispersion in a solution are added at block 104. It should be noted that the operations performed in blocks 102 and 104 may be performed in any order and/or combined or separated as appropriate.

Glass particles are then synthesized by mechanochemical milling at block 106. Any standard mechanical milling technique may be used. In some embodiments, ball milling is used. Examples of milling apparatus include rotary mills, vertical mills, and planetary ball mills. The mixture is milled with sufficient energy input to the system for a mechanochemical reaction of the raw materials. The synthesis may be run at room temperature or other temperatures low enough to prevent crystallization of the amorphous glass particles.

Once the glass particles are synthesized, post-synthesis milling may be performed to reduce particle size. (Block 108). Between blocks 106 and block 108, there may be additional operations to remove the synthesized particles from the cup or other milling apparatus, grind, and sieve them. A portion of the synthesized particles may be caked onto the milling apparatus, and are scraped off, before grinding and sieving to loosen or remove larger agglomerations from the particles. Unlike the mechanochemical milling at block 106, the post-synthesis milling does not cause a mechanochemical reaction, but can be used to reduce particle size. While the same apparatus may be used for blocks 106 and 108 in some embodiments, post-synthesis milling generally occurs for a significantly shorter period of time and lower speeds than during synthesis.

The particles can be dry milled and/or wet milled. However, dry milling has been found ineffective to reduce particle size and can increase it by fusing particles. Accordingly, in some embodiments, post-synthesis milling does not involve dry milling. Wet milling is performed with the particles dispersed in a solvent. As described further below, in some embodiments, one or more additives to reduce particle size and ease dispersion may be added during post-synthesis milling.

Once synthesized, and (if performed) milled, the particles may be incorporated into a film. In some embodiments, the film includes the particles in a matrix of an organic material. In some embodiments, the particles may be incorporated into a slurry for casting in an operation 110. At this stage, all of the particles have a size that is less than the thickness of film to be cast.

Ionically conductive particles may be incorporated into electrolyte films. A solid electrolyte film of the present invention may be of any suitable thickness depending upon the particular battery design. For many applications, the thickness of the film may be no more than 200 µm, no more than 250 µm, no more than 100 µm, no more than 50 µm, or no more than 5 µm according to various embodiments. In some embodiments, the electrolyte may be significantly thicker, e.g., on the order of millimeters. The film may contain a particle having a largest dimension of no more than 50% of its thickness, or no more than 20% of its thickness. According to various embodiments, the electrolyte films may or may not include an additional salt. The ionically conductive particles may further be included in an electrode film along with active material and, in some embodiments, an electronically conductive additive.

In one example method using solution processing, the components of the film, including the organic phase or precursors thereof and the particles, are mixed together by using various laboratory and industrial equipment such as sonicators, homogenizers, high-speed mixers, rotary mills, vertical mills, and planetary ball mills. Mixing media can be added to aid homogenization, by improving mixing, breaking up agglomerates and aggregates, thereby eliminating film imperfection such as pin-holes and high surface roughness. The resulting mixture is in a form of uniformly mixed slurry with a viscosity varying based on the components and solvent content. The substrate for casting can have different thicknesses and compositions. Examples include aluminum, copper and mylar. The casting of the slurry on a selected substrate can be achieved by different industrial methods. After casting, the film may be dried to remove the solvent. In some embodiments, porosity can be reduced by mechanical densification of films (resulting in, for example, up to about 50% thickness change) by methods such as calendaring between rollers, vertical flat pressing, or isostatic pressing.

Examples of organic phase materials include styrene ethylene butylene styrene (SEBS), styrene-butadiene-styrene (SBS), styrene-isoprene-styrene (SIS), styrene-butadiene rubber (SBR), polystyrene (PSt), polybutadiene (PBD), polyethylene (PE), polydimethylsiloxane (PDMS), and polyisoprene (PI). Further example includes polyethylene oxide (PEO).

According to various embodiments, the particles that are incorporated into the film and slurry are coated with one or more additives as described below. This is distinct from processes in which additives are removed from the particles prior to use. The incorporated particles interact with the polar ends of the additives. In some embodiments, the additives are non-volatile and have a boiling point of at least 200° C.

The method described in FIG. 7 may be applied to produce glass-ceramic particles, with the addition of an operation of raising a temperature above the crystallization temperature to induce crystallization. The methods described herein are particularly advantageous for sulfide glass and glass ceramic particles, as these particles have a tendency to form large particles during milling. However, the method described in FIG. 7 may also be applied to produce oxide glass particles, with block 102 modified to provide the appropriate raw materials.

In some embodiments, one or more additives are introduced to control particle size and/or reduce subsequent dispersion time. The additives may provide surface interactions and may be broadly classified as surfactants or surfactant-type molecules that have polar heads and non-polar tails. As described further below, the additives may be non-ionic or ionic according to various embodiments.

The one or more additives may be added during one or both of synthesis and post-synthesis milling. Introducing additives during synthesis has challenges not present in post-synthesis, due to the large amount of energy added to the system during synthesis and that the mechanochemical reaction needs to proceed. It was found that certain additives can be added at the synthesis stage, rather than during post-synthesis, coating the reaction product and without reacting. Certain compounds such as polyvinylidene fluoride (PVDF) have been found to cause unwanted reactions during synthesis of the glass particles and cannot be employed as an additive or component thereof at that stage. In some embodiments, by introducing an ionic or non-ionic additive as described above during synthesis, a subsequent wet milling operation can be avoided.

If an additive is used during synthesis, it is weighed into the reaction vessel (e.g., ball mill cups) along with other reagents and the synthesis run normally. If the additives are used in a dry milling step then the glass particles, additive, and milling media are weighed into a cup. The cup is sealed and milled on the ball mill at the desired speed and time, and then the cups brought back into the glovebox. The sulfide glass is scraped out of the cups and sieved. If the additives are used in wet milling then a similar procedure to the dry milling is used, with the addition of a solvent. After the milling the suspended glass is centrifuged out of solution. The media are put on a sieve to remove glass caked on, and the sieved and centrifuged portions are combined. This material is then dried by heating, under vacuum, or a combination of the two.

The glass particles remain coated with the additives after the processing (synthesis and post-synthesis milling) described above. This is distinct from manufacturing processes in which additives are removed prior to incorporation into a product and introduces several considerations for subsequent processing. First, the addition of an additive may reduce the crystallization temperature of the sulfide glass. This decreases the working temperature range for all subsequent operations in embodiments in which crystallization is avoided. As described in U.S. patent application Ser. Nos. 15/607,323 and 15/662,048, incorporated by reference herein, in some embodiments, an electrolyte or electrode material incorporating the glass particles may be hot pressed or other processing at elevated temperatures. As such, the allowable processing temperature may be decreased for these processes. Solvent cast films that incorporate glass particles coated with the additives may retain solvent easier than films that do not include additive-coated particles. Because retained solvent can negatively affect aspects of the cast films, the cast film may be more aggressively dried with heating as well as vacuum.

As described below with reference to the Figures, addition of a non-ionic or ionic additive as described above during synthesis or wet milling reduces average particles size. Further, additives having ionic or non-ionic polar ends improve wetting by non-polar solvents and increase time in suspension. These additives may bind strongly to the surface of the particles with their ionic or non-ionic polar ends, and interact with the solvent with their non-polar ends such as hydrocarbon tails. In addition, by coating the particles, the hydrocarbon chains prevent particle-particle ionic interactions, which can reduce agglomeration. If the non-polar portion is not large enough (e.g., with small molecule ethers such as dibutyl ether), this effect may not be observed. If the non-polar portion is too large, other undesirable effects may be observed. Further, if the additive is too polar, it may induce crystallization.

Additives

In some embodiments, the additives are amphiphilic compounds. As used herein, "amphiphilic" refers to a compound having a polar water-soluble group attached to a water-insoluble hydrocarbon chain. In many embodiments, the amphiphilic compounds have a polar head and a non-polar tail; however, hydrocarbon chains that are functionalized with polar groups on both ends (forming a compound having a non-polar middle section and polar ends) may also be used in some embodiments.

According to various embodiments, the additives may be non-ionic or ionic. In some embodiments, non-ionic additives have a non-polar section covalently bound to a polar non-ionic section. In some embodiments, the non-polar section may be a branched or unbranched hydrocarbon chain having between 6 and 50 carbons, or between 6 and 40 carbons.

The hydrocarbon chain may be fully or partially saturated. For example, in some embodiments, a non-ionic additive includes compounds of Formula I:

(Formula I)

where x is between 4 and 48 and R is a polar non-ionic group.

While the non-polar portion of the non-ionic additive in Formula I is an unbranched, fully saturated hydrocarbon chain, as noted above, in other embodiments, the hydrocarbon chain may include branches and/or double bonds.

Examples of polar non-ionic R groups include glycosides and other sugars, ketones, aldehydes, esters, amides, nitriles, phosphates, phosphonates, phosphines, thioethers, thioesters, sulfates, sulfonates, sulfoxides, sulfones, alcohols, thiols, and carboxylic acids. The R groups may include alkyl groups (e.g., R includes alkyl phosphates, alkyl phosphonates, alkyl phosphines, alkyl sulfates, alkyl sulfonates, alkyl sulfoxides, and alkyl sulfones). In some embodiments, if present, the alkyl group of a polar non-ionic R group is fairly small, e.g., 1-4 carbons. Longer alkyl groups may be used in some embodiments.

It should be noted that alcohols, thiols, carboxylic acids and other polar functional groups with acidic protons are considered non-ionic additives for the purpose of this list.

In some embodiments, the polar section includes one or more ethylene oxide units and the non-polar section includes a hydrocarbon chain. In certain examples described below, polyethylene-block-poly(ethylene glycol) (also referred to as polyethylene-block-poly(ethylene oxide or PE-b-PEO) having an unbranched hydrocarbon chain of approximately 34 carbons and approximately 2 polar ethylene oxide units is used. Non-ionic additives having other lengths of hydrocarbons and ethylene oxide repeat units are expected to perform in a similar manner.

In some embodiments, a non-ionic additive includes compounds of Formula II:

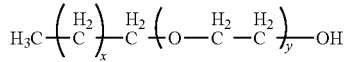

Formula II where x is between 4 and 48 and y is between 0 and 10. Formula II represents PE-b-PEO block copolymers where x is an even number and y is greater than 0. Commercially available compounds of Formula II include Brij® 93 ($C_{18}H_{35}(OCH_2CH_2)_n$OH), n has an average value of 2, and other Brij® compounds, commercially available from various suppliers including Sigma-Aldrich®. As described above with respect to Formula I, while the non-polar portion of the non-ionic additive in Formula II is an unbranched, fully saturated hydrocarbon chain, in other embodiments, the hydrocarbon chain may include branches and/or double bonds.

In some embodiments, a non-ionic additive may be a surfactant derived from alkylphenols. Examples include IGEPAL® CO-520 (polyoxyethylene (5) nonylphenylether, branched) and other IGEPAL® compounds available from Sigma-Aldrich®, Triton™ X-45 and other Triton™ compounds, Nonidet P-40 and other Nonidets, Nonoxynol-9 and other Nonoxynols, and NP-40.

Other examples of non-ionic additives include poly(ethylene glycol) monooleates such as Isoceteth-20 and other Isoceteth compounds, and Polidocanol. Further examples include n-Octyl beta-D-thioglucopyranoside, alkyl glucosides including decyl glucoside and lauryl glucoside, long chain alcohols including oleyl alcohol and stearyl alcohol, cocamide DEA, cocamide MEA, glycerol monostearate and monolaurin, alkyl maltosides, alkyl sorbitans such as monolaurate, monostearate and tristearate.

As in the case of the non-ionic additives, the ionic additives have a non-polar section and a polar section. The non-polar section is as described above with respect to the ionic additives, while the polar section contains a salt. The ionic group is expected to bind more tightly to the surface of the glass particles than the non-ionic polar groups of the non-ionic additives described above.

In some embodiments, an ionic additive is an anionic additive of Formula III:

Formula III where x is between 4 and 48, A– is any anionic group and M+ is any cationic counter ion. In some embodiments, M+ is Li+. In other embodiments, M+ is another metal cation, and may be a multiply charged cation, or an organic cation. An organic cation may be an ammonium-type cation. As described above with respect to Formula I, while the non-polar portion of the non-ionic additive in Formula III is an unbranched, fully saturated hydrocarbon chain, in other embodiments, the hydrocarbon chain may include branches and/or double bonds.

In some embodiments, an ionic additive is a cationic additive of Formula IV:

Formula IV where x is between 4 and 48, $Cat^+$ is any cationic functional group, and $A^-$ is any anionic counter ion. In some embodiments, $Cat^+$ is an ammonium group (Alkyl-$NH_3^+$ or Alkyl-$NR_3^+$ where each R is independently H or C1-C4 alkyl such as methyl). $A^-$ may be a halide (e.g., $Cl^-$), or a multiply charged anion such as a phosphate anion or sulfate anion. One example of an ionic additive is lithium dodecyl sulfate (LDS), shown below as structure I:

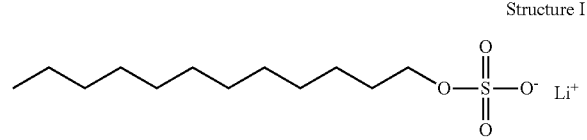 [SMILES: CCCCCCCCCCCCOS(=O)(=O)[O-] ; [Li+]]

Structure I

Further examples of ionic additives include other salts of dodecyl sulfate (e.g., such as sodium, potassium and ammonium salts), N-dodecyl-N,N-dimetyl-3-ammonio-1-propanesulfonate, dioctyl sulfosuccinate sodium salt and salts with other cations such as lithium, salts of glycolic acid ethoxylate lauryl ether and related alkyl ethers, salts of dodecylbenzenesulfonate including sodium and lithium salts, long chain alkyl carboxylates C6-C50 including the acids and sodium and lithium salts (also known as saturated fatty acids), long chain alkyl carboxylates C6-C50 with one or more double bonds, including the acids and sodium and lithium salts (also known as unsaturated fatty acids with any number of points of unsaturation and combinations of cis and trans bonds), long chain hydrocarbons C6-50 with or without double bonds as above but with a phosphate or phosphonate group in place of the carboxylate (including fully protonated, single salt or double salt of lithium and/or sodium), long chain hydrocarbons C6-50 with or without double bonds as above but with a sulfate or sulfonate group in place of the carboxylate (protonated or lithium or sodium salts), and cationic surfactants such as alkyl ammonium salts (e.g., cetyltrimethylammonium bromide).

While ionic and nonionic amphiphilic compounds are described above, in some embodiments, non-polar polymers, e.g., SEBS, may be used as additives. As described below, with respect to Example 6, the addition of these polymers can reduce particle size. However, they are less useful than the amphiphilic compounds for improving dispersion and reducing agglomeration.

Example Embodiments

Reference Example: Synthesis of Undoped $Li_2S$—$P_2S_5$ Glass Particles without Additive In a glovebox under inert atmosphere a 100 mL zirconia cup is loaded 75 g 10 mm zirconia balls, 3.09 g $P_2S_5$ and 1.91 g $Li_2S$. The cup is sealed and milling is performed on a Fritsch Pulverisette 5 at 200 rpm for ½ h and then 400 rpm for 18 h. The cup is returned to the glovebox and the sulfide glass scraped from the walls of the cup. The glass and milling media are again sealed in the cup and milled at 200 rpm for 10 minutes. Inside the glovebox the glass is sieved and the fraction passing a 25 micron sieve is collected.

Example 1: Synthesis of Undoped $Li_2S$—$P_2S_5$ Glass Particles with 1% Wt PE-b-PEO The synthesis is performed exactly as described in the Reference Example except that 50 mg PEO-b-PE is included in the cup when the other reagents are added. In a glovebox under inert atmosphere a 100 mL zirconia cup is loaded 75 g 10 mm zirconia balls, 3.09 g $P_2S_5$, 1.91 g $Li_2S$ and 50 mg PE-b-PEO (PE of an average 34 carbons, PEO of an average 2 ethylene oxide units). The cup is sealed and milling is performed on a Fritsch Pulverisette 5 at 200 rpm for ½ h and then 400 rpm for 18 h. The cup is returned to the glovebox and the sulfide glass scraped from the walls of the cup. The glass and media are again sealed in the cup and milled at 200 rpm for 10 minutes. Inside the glovebox the glass is sieved and the fraction passing a 25 micron sieve is collected.

Example 2: Synthesis of Undoped $Li_2S$—$P_2S_5$ Glass Particles with 0.5% Wt PE-b-PEO The synthesis is performed similarly to that described in Example 1 except that 25 mg PEO-b-PE is included in the cup when the other reagents are added. In a glovebox under inert atmosphere a 100 mL zirconia cup is loaded 75 g 10 mm zirconia balls, 3.09 g P2S5, 1.91 g Li2S and 25 mg PEO-b-PE. The cup is sealed and milling is performed on a Fritsch Pulverisette 5 at 200 rpm for ½ h and then 300 rpm for 40 h. The cup is returned to the glovebox and the sulfide glass scraped from the walls of the cup. The glass and media are again sealed in the cup and milled at 200 rpm for 10 minutes. Inside the glovebox the glass is sieved and the fraction passing a 25 micron sieve is collected.

Example 3: Synthesis of Undoped $Li_2S$—$P_2S_5$ Glass Particles with 0.5% Wt LDS The synthesis is performed similarly to that described in Example 2 except that 25 mg LDS is included in the cup when the other reagents are added. In a glovebox under inert atmosphere a 100 mL zirconia cup is loaded 75 g 10 mm zirconia balls, 3.09 g $P_2S_5$, 1.91 g $Li_2S$ and 25 mg lithium dodecylsulfate. The cup is sealed and milling is performed on a Fritsch Pulverisette 5 at 200 rpm for ½ h and then 300 rpm for 40 h. The cup is returned to the glovebox and the sulfide glass scraped from the walls of the cup. The glass and media are again sealed in the cup and milled at 200 rpm for 10 minutes. Inside the glovebox the glass is sieved and the fraction passing a 25 micron sieve is collected.

Example 4: Size Distribution of Sulfide Glass Particles

Figure 1:
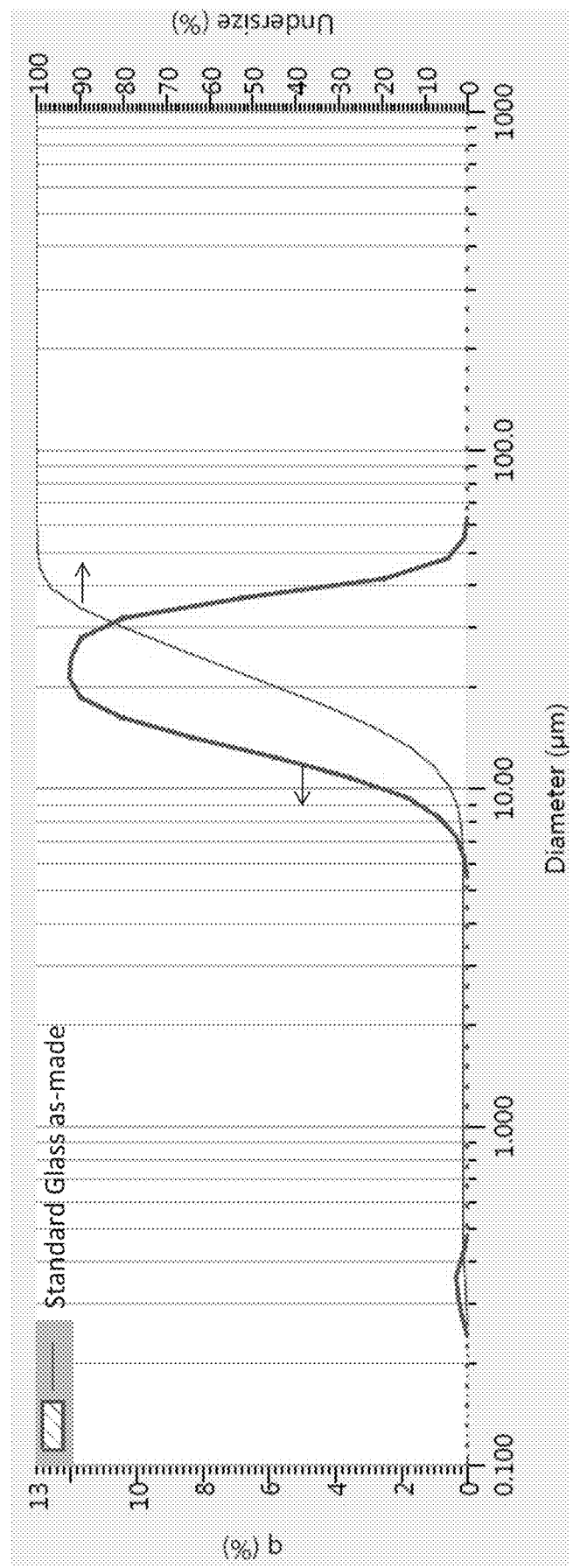
FIG. 1 shows a size distribution of sulfide glass particles prepared with no additives and no additional grinding steps after sieving.

FIG. 1 shows a size distribution of sulfide glass particles prepared as described in the Reference Example, with no additives and no additional grinding steps after sieving. The % undersize is also shown (right axis). The figure shows an average size of about 25 μm. (Elongated particles, having one dimension much larger than 25 μm can pass through the 25 μm of the sieve. The measurements provide the average diameter of the particles, so if they are close to 25 μm on two axes and much larger on the third axis, the average particle diameter is larger than 25 μm. During the sieving process some particles may be agglomerated into larger groups which results in an effective particle size greater than 25 μm.)

Figure 2:
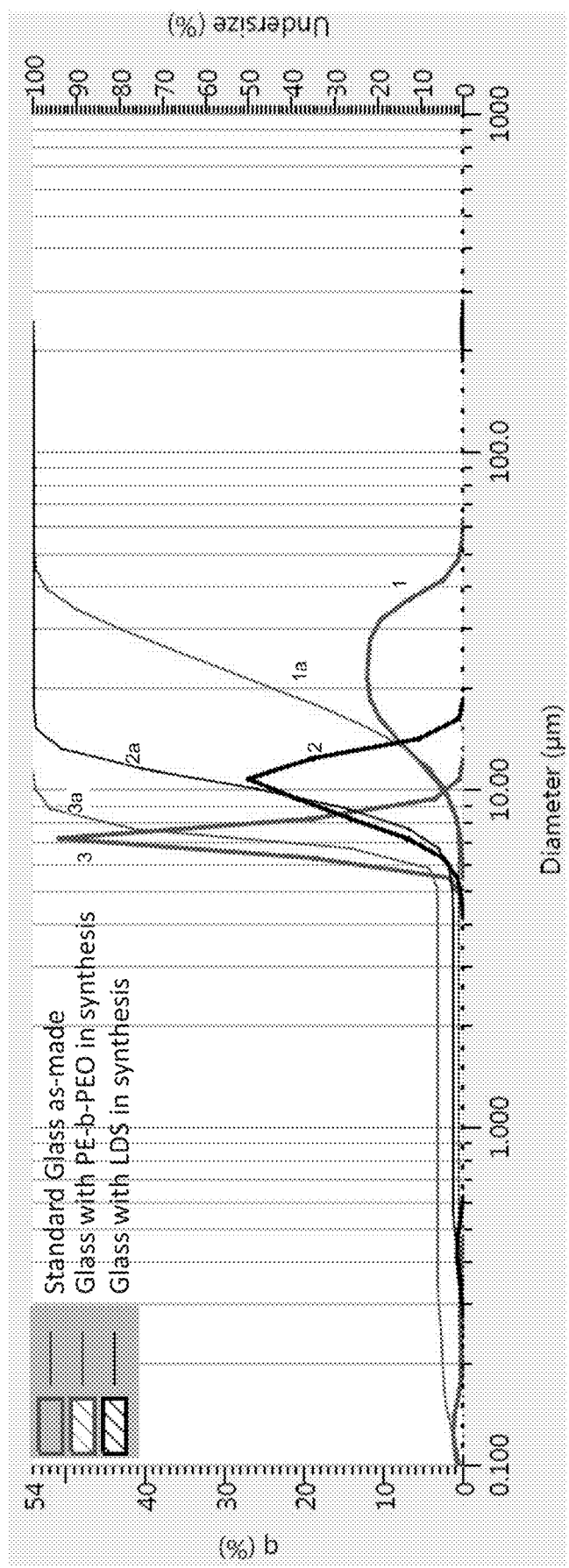
FIG. 2 shows size distributions of (1) sulfide glass particles synthesized with no additives; (2) sulfide glass particles synthesized with LDS additive; and (3) sulfide glass particles synthesized with PE-b-PEO.

Example 5: Comparisons of Size Distributions of Sulfide Glass Particles Using Various Additives During Synthesis FIG. 2 shows size distributions of (1) sulfide glass particles synthesized with no additives as in Reference Example 1; (2) sulfide glass particles synthesized with LDS additive as in Example 3; and (3) sulfide glass particles synthesized with PE-b-PEO additive as in Example 2. The glass particles synthesized in the presence of LDS had an average size of about 10 μm and the glass particles synthesized in the presence of PE-b-PEO has an average size of about 5.5 μm, both significantly smaller than the 25 μm size of the glass particles synthesized with no additive. FIG. 2 also shows the percent of particles that are under a particle size (right axis, curves labelled 1a, 2a, 3a). Further both the glass particles synthesized in the presence of LDS and the glass particles synthesized in the presence of PE-b-PEO had no particles over 20 μm.

Figure 3:
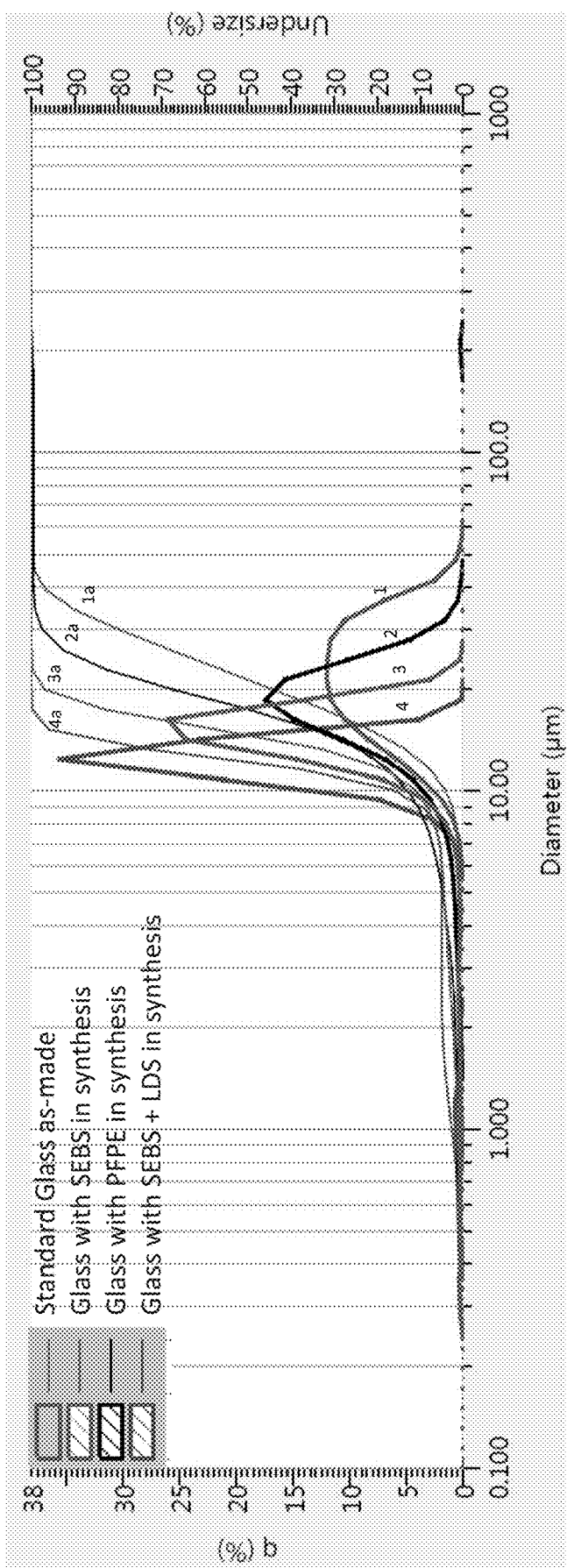
FIG. 3 shows size distributions of (1) sulfide glass particles synthesized with no additives; (2) sulfide glass particles synthesized with a perfluoropolyether (PFPE) additive (0.5 wt %); (3) sulfide glass particles synthesized with a styrene ethylene butylene styrene (SEBS) additive (0.5 wt %); and (4) sulfide glass particles synthesized with both SEBS (0.3 wt %) and LDS (0.2 wt %) additives.

Example 6: Comparisons of Size Distributions of Sulfide Glass Particles Using Various Additives During Synthesis FIG. 3 shows size distributions of (1) sulfide glass particles synthesized with no additives as in Reference Example 1; (2) sulfide glass particles synthesized with a perfluoropolyether (PFPE) additive (0.5 wt %); (3) sulfide glass particles synthesized with a styrene ethylene butylene styrene (SEBS) additive (0.5 wt %); and (4) sulfide glass particles synthesized with both SEBS (0.3 wt %) and LDS (0.2 wt %) additives. FIG. 3 also shows the percent of particles that are under a particle size (right axis, curves labelled 1a, 2a, 3a, 4a). For PFPE or SEBS used as 0.5 wt % additives, average particle sizes of 15 μm and 18 μm, respectively, were obtained. The SEBS and LDS mixture gave an average particle size of about 12 μm, between that of SEBS and LDS alone. The SEBS and PFPE were unfunctionalized, non-polar molecules.

Figure 4:
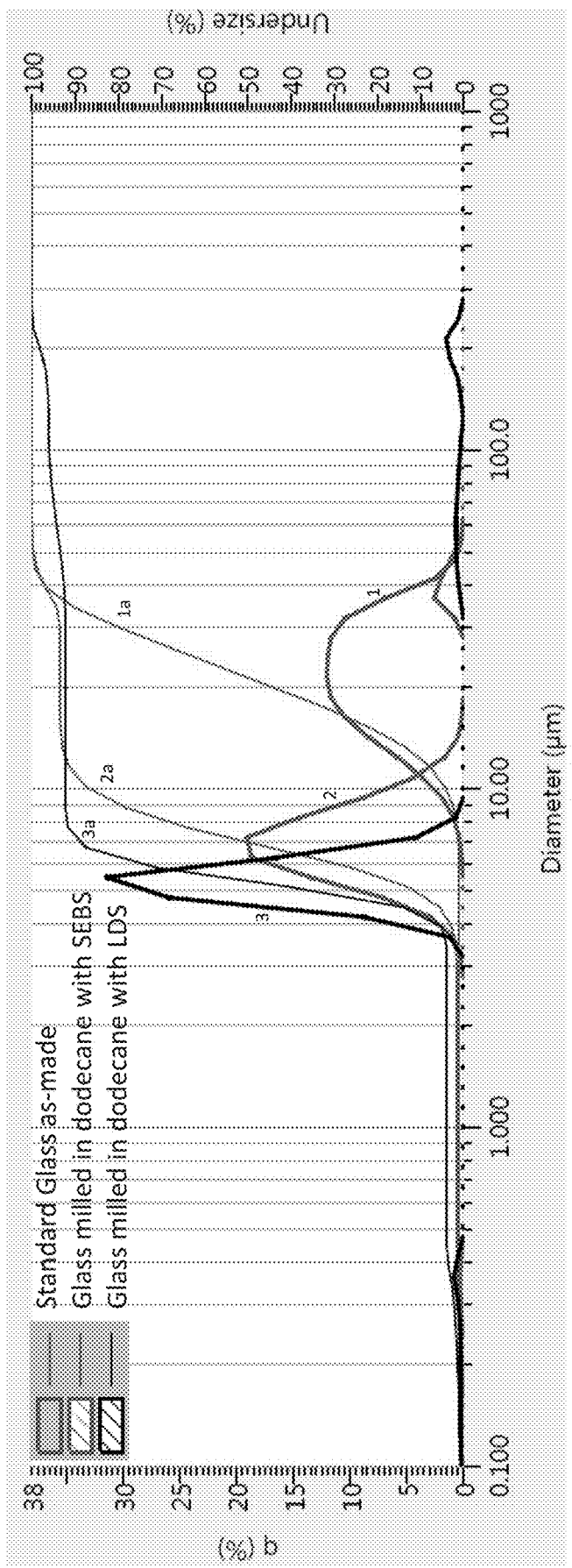
FIG. 4 shows size distributions of sulfide glass particles synthesized followed by (1) no wet milling; (2) wet milling in dodecane with SEBS and 1 mm media; and (3) wet milling in dodecane with LDS and 1 mm media.

Example 7: Comparisons of Size Distributions of Using Various Additives During Wet Milling FIG. 4 shows size distributions of sulfide glass particles synthesized as in the Reference Example followed by (1) no wet milling; (2) wet milling in dodecane with SEBS and 1 mm media; and (3) wet milling in dodecane with LDS and 1 mm media. Wet milling with additives gives materials with small particle sizes. Milling in dodecane with SEBS and 1 mm media gives an average particle size of 7 μm (similar to the particle size obtained from adding PEO-b-PE in the synthesis step). The same experiment with LDS as the additive gives an average particle size of 5.5 μm. FIG. 4 also shows the percent of particles that are under a particle size (right axis, curves labelled 1a, 2a, 3a).

Example 8: Particle Aggregation—No Additive

Figure 5:
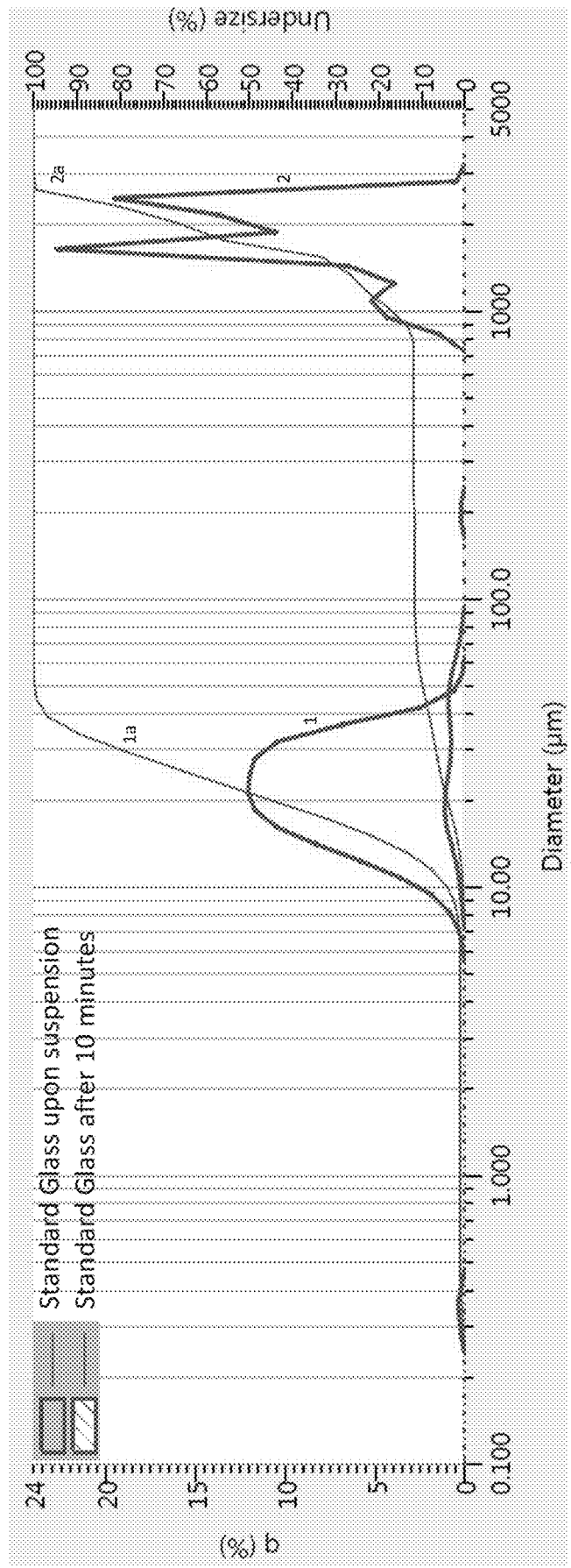
FIG. 5 shows size distributions of glass particles suspended in mineral spirits (1) upon suspension and (2) after 10 minutes.

FIG. 5 shows size distributions of glass particles prepared as described with respect to the Reference Example suspended in mineral spirits (1) upon suspension and (2) after 10 minutes. The particles have completely aggregated after 10 minutes. FIG. 5 also shows the percent of particles that are under a particle size (right axis, curves labelled 1a and 2a).

Example 9: Particle Aggregation—LDS Additive and SEBS Additive

Figure 6:
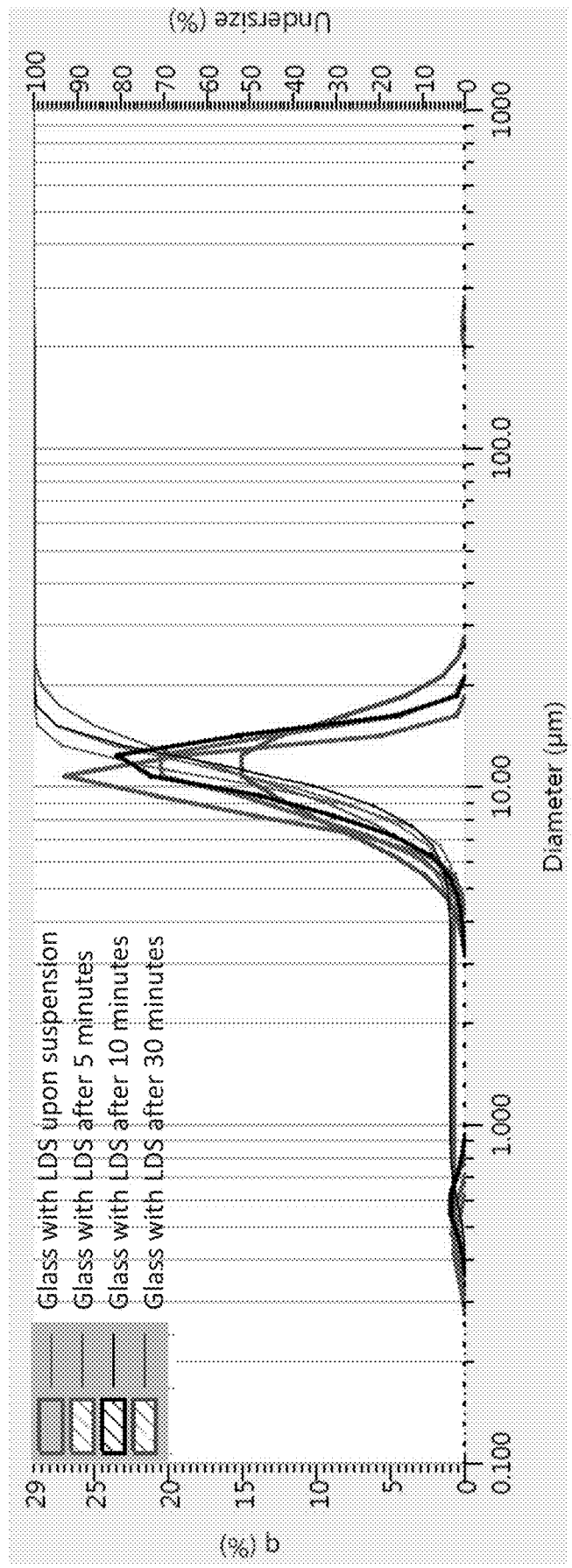
FIG. 6 shows size distributions of glass particles synthesized with LDS suspended in mineral spirits upon suspension, after 5 minutes, after 10 minutes, and after 30 minutes.

FIG. 6 shows size distributions of glass particles synthesized with LDS as described in Example 3 and suspended in mineral spirits upon suspension, after 5 minutes, after 10 minutes, and after 30 minutes. The highest peak is for the glass upon suspension, and the lowest for after 30 minutes. Similarly, the threshold size that 100% of particles are under shifts to the right as time passes. However the results show only a minor shift in size and intensity of the signal, indicating only a little aggregation and precipitation.

A sample milled with SEBS saw a loss of signal in the expected particle range and the growth of a new signal in the millimeter range, presumably via aggregation of the primary particles, over the course of 5 minutes in dilute hydrocarbon suspension.

Example 10: Particle Size Measurement

Under an argon atmosphere, 50 mg of sulfide glass are weighed into a mixing cup with 2.00 g p-xylene and 20 mg Brij 93 surfactant. 2×10 mm ZrO2 mixing media are added and the closed cup mixed on a planetary centrifugal mixer (Thinky AR-100) at 2000 rpm for 2 minutes. The cup is removed from the argon atmosphere and a portion of the sample is introduced into a Horiba LA-960 particle size analyzer with 500 mL 1 wt % Brij 93 surfactant in mineral spirits as the circulating solvent. Time between mixing and introduction into the analysis instrument is kept to less than 2 minutes so as to be able to observe aggregation time.

Example 11: Electrolyte Film

An electrolyte film may be formed by loading glass particles coated with an additive as described above to a mixture of amino-terminated polydimethylsiloxane and SEBS (4:1 w/w ratio) in p-xylene. Some formulations are described in U.S. patent application Ser. Nos. 15/607,323 and 15/662,048, incorporated by reference herein, though any The cup may be equipped with a vacuum adapter and placed in a Thinky mixer to form a slurry. The slurry can be cast on foil using a doctor blade coater, dried under argon for 1 hr, and then under vacuum at 70° C. for additional 12-16 hrs.

In the description above, the terms "average size" and "average diameter" are used interchangeably and refers to average diameter of equivalent spheres of the particles. For the particle sizes, the volume average is provided.

Also, in the description above and in the claims, numerical ranges are inclusive of the end points of the range. For example, "between 1 and 4" includes 1 and 4. Similarly, ranges represented by a dash are inclusive of the end points of the ranges.

The foregoing describes the instant invention and its certain embodiments. Numerous modifications and variations in the practice of this invention are expected to occur to those skilled in the art. For example, while the above specification describes electrolytes and cathodes for alkali ion or alkali metal batteries, the compositions described may be used in other contexts. Further, the batteries and battery components described herein are no limited to particular cell designs. Such modifications and variations are encompassed within the following claims.

The invention claimed is:

1. A method, comprising:
providing a raw material composition comprising lithium sulfide ($Li_2S$);
adding an amphiphilic compound to the raw material composition to form a mixture to be milled; and
synthesizing sulfide-containing particles by mechanically milling the mixture.

2. The method of claim 1, wherein the amphiphilic compound is an ionic compound.

3. The method of claim 1, wherein the amphiphilic compound is a non-ionic compound.

4. The method of claim 1, wherein the sulfide-containing particles are coated with the amphiphilic compound.

5. The method of claim 1, wherein the raw material composition further comprises phosphorous pentasulfide ($P_2S_5$).

6. The method of claim 1, wherein the amphiphilic compound is a block copolymer.

7. The method of claim 6, wherein the amphiphilic compound is a polyethylene-b-poly(ethylene oxide).

8. The method of claim 4, wherein the amphiphilic compound comprises a non-polar hydrocarbon chain covalently bonded to a non-ionic group.

9. The method of claim 1, wherein the amphiphilic compound comprises lithium.

10. The method of claim 1, wherein the amphiphilic compound is lithium dodecyl sulfate.

11. The method of claim 1, further comprising wet milling the synthesized particles.

12. The method of claim 1, wherein the average diameter of the synthesized particles is less than 20 microns.

13. The method of claim 1, wherein the average diameter of the synthesized particles is less than 10 microns.

14. The method of claim 1, wherein none of the synthesized particles have a diameter greater than 20 microns.

15. The method of claim 1, wherein the synthesized particles do not agglomerate substantially in a non-polar solvent after 10 minutes.

16. A method, comprising:
providing particles having a first size distribution;
adding an additive to the particles;
milling the particles in the presence of the additive to reduce the size of the particles, wherein the particles have a second size distribution after milling, wherein the additive is an amphiphilic compound selected from ionic compounds and non-ionic compounds having non-polar hydrocarbon chains of between 6 and 50 carbons, and
forming an electrolyte film incorporating the milled particles.

17. The method of claim 1, A method, comprising:
providing a raw material composition comprising sulfur;
adding an amphiphilic compound to the raw material composition to form a mixture to be milled;
synthesizing sulfide-containing particles by mechanically milling the mixture; and further comprising forming an electrolyte film incorporating the synthesized particles.

18. The method of claim 17, wherein the synthesized particles are not subject to wet milling prior to incorporation into the electrolyte film.

19. The method of claim 17, further comprising wet milling the synthesized particles prior to incorporation into the electrolyte film.

20. The method of claim 16, wherein the amphiphilic compound is an ionic compound.

21. The method of claim 16, wherein the amphiphilic compound is a non-ionic compound.

* * * * *